(No Model.)
F. A. WILLIAMS.
TUBE COUPLING.
No. 381,869. Patented Apr. 24, 1888.
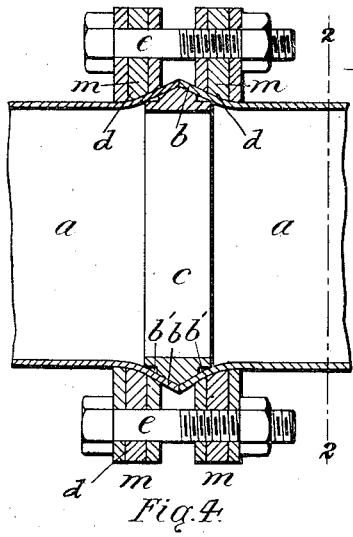
Fig. 1.
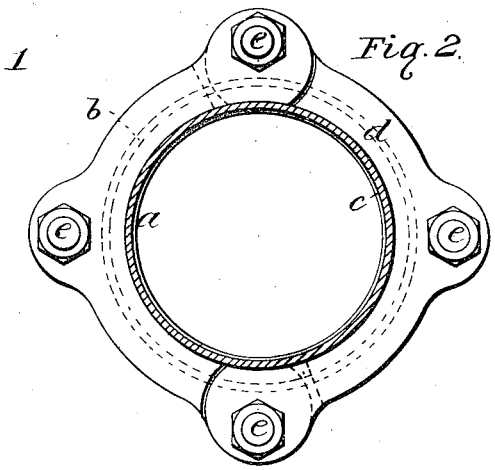
Fig. 2.
Fig. 4.
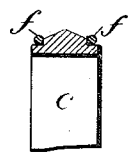
Fig. 3.
Fig. 5.
Fig. 6.
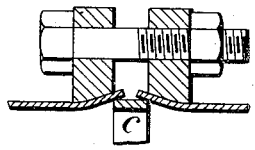
Fig. 7.
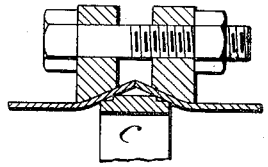
Fig. 8.
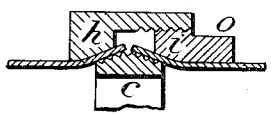
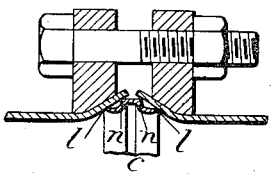
Fig. 9.
Witnesses:
John A. Rennie
Wm. H. Hannam
Inventor:
Frank A. Williams,
By his Attorneys,
Arthur C. Fraser & Co.

UNITED STATES PATENT OFFICE.

FRANK ARTHUR WILLIAMS, OF ALBRIGHTON, COUNTY OF SALOP, ENGLAND.

TUBE-COUPLING.

SPECIFICATION forming part of Letters Patent No. 381,869, dated April 24, 1888.

Application filed November 19, 1886. Serial No. 219,424. (No model.) Patented in England October 5, 1886, No. 12,614; in France November 11, 1886, No. 179,591, and in Belgium November 17, 1886, No. 75,263.

*To all whom it may concern:*

Be it known that I, FRANK ARTHUR WILLIAMS, a subject of the Queen of Great Britain, residing at Albrighton, in the county of Salop, England, have invented certain new and useful Improvements in Joints for Metal Tubes, of which the following is a specification.

This invention is the subject of patent in Great Britain, No. 12,614, dated October 5, 1886; patent in France, No. 179,591, dated November 11, 1886, and patent in Belgium, No. 75,263, dated November 17, 1886.

My invention relates to means of joining together the ends of tubes of iron or steel, or other analogous metals, so as to make a secure joint against the pressure of water or other fluid; and it has for its object to avoid the expense and the weakening of the tubes occasioned by screwing their ends in the ordinary manner, and, as a consequence thereof, to enable thinner metal to be used for a given strength of tube than heretofore.

According to this invention the joint is made against an interior ferrule, preferably of the same internal diameter as the tubes, in such a manner that a sharp edge of the ferrule cuts into an expanded interior surface of each tube, and a packing-ring is securely inclosed in an angular recess formed around each end of the ferrule, so that such packing-ring is closed into the angle in a manner which precludes any chance of its escape when the joint is made, and also protects it from destruction.

In the accompanying drawings, Figure 1 is a longitudinal section of a joint formed according to this invention between the ends of two tubes. Fig. 2 is a transverse section taken on line 2 2 of Fig. 1. Fig. 3 is a plan or edge view of one of the flanges or rings by which the tubes are drawn against the ferrule. Fig. 4 is a fragmentary section of the ferrule and packing-rings. Fig. 5 is an elevation of a modified construction of flange or ring. Figs. 6, 7, 8, and 9 are fragmentary longitudinal sections showing different modified constructions.

Referring to the drawings, let *a a* designate the tubes to be united, the ends of which, lettered *b b*, are expanded; *c*, an internal ring or ferrule; *d d*, loose rings or flanges fitting around the expanded ends of the tubes, and *e e* bolts passing through both flanges. A sharp exterior edge is formed at each end of the ferrule, as shown, and the exterior of the middle portion of the ferrule is formed as reversed frusta of cones to fit within the expanded ends of the tubes, and the section of the ferrule is such as to leave two annular spaces, *b' b'*, of angular section between the ferrule and the interior of such expanded ends.

Fig. 4 is a detached section taken through any point around the circumference of the ferrule *c*, and shows packing-rings *f f*, of india-rubber or other suitable material, around the ferrule.

To make the joint, the ferrule *c*, with the packing-rings therearound, is placed within the expanded ends *b b* of the tubes, and then the loose flanges *d d* are drawn tightly toward one another by means of the bolts, and the expanded ends of the tubes are thus forced tightly around the ferrule, so that the sharp edges of the ferrule cut into the interior surfaces of the expanded ends of the tubes, and the packing-rings *f f* are securely pressed into the annular spaces between the ferrule and the expanded ends of the tubes. As such spaces are completely closed in on all sides, it is impossible for the packing to be forced out by any amount of pressure, and it is also securely prevented from being destroyed by exposure. Moreover, these packings are placed against abutments formed at each end of the conical surfaces of the ferrule in planes at right angles to the axis of the tubes, and cannot, therefore, be forced out of place as the joint is being tightened up. The outer ends of the expanded parts of the tubes are pressed firmly around the conical surfaces of the ferrule. Any slight leakage through the joints formed by the sharp edges of the ferrule is stopped by the packings.

The flanges *d d* are made in halves for being readily placed around the tubes after the ends have been expanded, thus facilitating the packing of the tubes. Each joint connecting the two halves of a flange is formed as a tongue, *m*, fitting within a slot in the other half, and one of the bolts *e* passes through both the tongue and the sides of the slot. The joints of the flanges may, however, be formed by rabbeting the parts together.

It is not necessary that the flanges be formed in halves, as they may be formed each in one piece, as shown by Fig. 5, and put onto a tube before both the ends thereof have been expanded.

For moderate pressures it is not essential for the edges of the ferrule to actually cut into the interior surfaces of the expanded ends of the tubes, as the packing-rings will make a sufficiently tight joint.

Figs. 6, 7, 8, and 9 illustrate different modifications of the invention, being each a longitudinal section through one side of the joint. In Fig. 6 the ferrule $c$ is shown quite plain, so as to present one sharp edge only to each expanded end of a tube and is without conical bearing-surfaces. In Fig. 7 the ferrule is shown with two sharp edges for each expanded end of a tube, and in Fig. 8 several sharp edges are shown for each expanded end. In the latter figure a modification of the loose flanges $d$ $d$ is shown. A loose screw-threaded socket, $h$, is placed around the expanded end of one tube and a threaded nipple, $i$, around the expanded end of the other tube, and by screwing the latter into the former the two tubes are drawn together. An unthreaded part, $o$, is formed at the back of the nipple $i$, by which it may be gripped for screwing up.

Fig. 9 illustrates a modification suitable for very high pressures. In this modification the sharp edges $l$ $l$ are capable of elastically yielding inward under considerable pressure as the joint is tightened up, and the section of the ferrule is such that, previously to the joint being tightened up, the edges $l$ $l$ first receive the pressure of the expanded ends of the tubes. The angles $n$ $n$ are formed thin to allow the edges $l$ $l$ to yield inward in the manner described, and the ring is preferably made of steel.

I am aware that it has been sought to attain the object of this invention by making a joint between the expanded ends of two wrought-iron tubes by means of an internal ferrule; but in such case broad bearing-surfaces only have been employed, without cutting-edges, and without packing-rings compressed into annular spaces formed by means of grooves in the ferrule and inclosed on all sides, and without abutments formed around the ferrule, in planes at right angles to the axis of the tubes, to receive the pressure of such packings. It has thus been necessary to bore out the expanded ends of the tubes to make them a good fit around the ferrule, which is not only expensive, but the bored ends are liable to be distorted and rendered useless by shocks during transit. The employment of my invention renders it quite unnecessary to bore the ends of the tubes.

I am aware, also, that it has been proposed to make a joint between the ends of two cast iron pipes by means of elastic packings around an internal ferrule, in combination with enlarged ends of the pipes; but the method proposed is one which would not satisfactorily answer the purpose, as it does not provide cutting-edges on the ferrule to cut into the pipes, nor does it provide for butting each packing against a shoulder or abutment formed around the ferrule, in a plane at right angles to the axis of the tubes, to prevent it from moving back under the pressure in tightening up the joint, nor does it provide for compressing such packing into a space inclosed on all sides to insure against its escape under the pressure of the fluid within the pipes and against liability to destruction by exposure.

I am also aware that a joint for cast-iron pipes has been proposed wherein the flanged ends of the pipes are turned out with an obtuse-angled conical surface, and a coupling-piece is arranged between them, having its opposite sides coned to the same obtuse angle as the pipe-flanges against which it abuts, and grooved on its coned faces for the reception of oakum or other packing; but in such a joint there are no cutting-edges to indent the ends of the pipe, and thereby to make a tight joint and inclose and preserve the packing.

The only pipe-joint of which I am aware wherein the ferrule which enters the expanded ends of the pipes is formed with cutting-edges to indent the pipe ends when the parts are drawn together is a joint for lead pipe, the ferrule of which has a flange at its middle, which is formed with concentric grooves and intervening edges, the purpose of which is to indent the extreme ends of the soft lead pipes, and thereby keep the lead from expanding laterally while screwing up the joint. In that joint the cutting-edges do not enter the flared ends of the pipe, as in my new joint, but are exterior to such flared portions and engage only the extreme end faces of the pipes. Such a construction would be inoperative if applied to a tube of wrought-iron or steel such as those for which my invention is designed.

I claim as my invention the following defined novel features, substantially as hereinbefore specified, namely:

1. A joint between two metallic tubes having expanded ends, consisting of the combination therewith of an internal ferrule having cutting-edges in position to cut into the interior flared surfaces of the tubes, and external flanges for drawing the expanded ends against said ferrule and thereby causing said edges to cut into said surfaces.

2. A joint between two metallic tubes having expanded ends, consisting of the combination therewith of an internal ferrule having grooves on its exterior and cutting-edges on opposite sides of said grooves, and in position to cut into the interior flared surfaces of the tubes, packing-rings in said grooves, and external flanges for drawing the expanded ends against said ferrule in such manner that said edges shall cut into the interior surfaces of the tubes, so as to close said grooves and confine said packing-rings therein.

3. A joint between two metallic tubes having expanded ends, consisting of the combination therewith of an internal ferrule having cutting-edges in position to cut into the interior flared surfaces of the tubes and formed on its exterior as reversed frusta of cones between said cutting-edges, and external flanges for drawing the expanded ends against said ferrule in such manner that said cutting-edges shall cut into the tubes and the latter are pressed tightly against the conical surfaces of the ferrule.

4. A joint between two metallic tubes having expanded ends, consisting of the combination therewith of an internal ferrule having exterior grooves of angular section, packing-rings in said grooves, and external flanges for drawing the expanded ends against said ferrule in such manner as to close said grooves, whereby said packing-rings are compressed within annular recesses of angular section and inclosed on all sides, so that they make a tight joint and their escape is prevented.

5. A joint between two metallic tubes having expanded ends, consisting of the combination therewith of an internal ferrule having exterior grooves of angular section with abrupt sides opposite the ends of the ferrule, packing-rings in said grooves, and external flanges for drawing the expanded ends against said ferrule in such manner as to close said grooves and compress the packing-rings therein, whereby in so drawing the parts together the packing-rings are forced against said abrupt sides of the grooves, which prevent their being displaced by the thrust of the expanded ends.

In witness whereof I have hereunto signed my name in the presence of two subscribing witnesses.

FRANK ARTHUR WILLIAMS.

Witnesses:
STEPHEN WATKINS,
WALTER SYDNEY PHILLIPS.